US011025967B2

(12) United States Patent
Zuo

(10) Patent No.: US 11,025,967 B2
(45) Date of Patent: Jun. 1, 2021

(54) METHOD FOR INSERTING INFORMATION PUSH INTO LIVE VIDEO STREAMING, SERVER, AND TERMINAL

(71) Applicant: Tencent Technology (Shenzhen) Company Limited, Shenzhen (CN)

(72) Inventor: Hongtao Zuo, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 21 days.

(21) Appl. No.: 16/001,729

(22) Filed: Jun. 6, 2018

(65) Prior Publication Data

US 2018/0288450 A1    Oct. 4, 2018

Related U.S. Application Data

(63) Continuation-in-part of application No. PCT/CN2017/072092, filed on Jan. 22, 2017.

(30) Foreign Application Priority Data

Jan. 28, 2016   (CN) .......................... 201610059652.1

(51) Int. Cl.
*H04N 21/234*   (2011.01)
*H04N 21/00*    (2011.01)
(Continued)

(52) U.S. Cl.
CPC ....... *H04N 21/23424* (2013.01); *H04N 21/00* (2013.01); *H04N 21/2187* (2013.01);
(Continued)

(58) Field of Classification Search
CPC ......... H04N 21/23424; H04N 21/2187; H04N 21/235; H04N 21/8126
See application file for complete search history.

(56) References Cited

U.S. PATENT DOCUMENTS 8,335,266 B2 * 12/2012 Liu .................. H04N 21/23406
                                                     375/240.26
8,719,865 B2 *  5/2014 Moonka ................. G11B 27/11
                                                     725/42
(Continued)

FOREIGN PATENT DOCUMENTS

CN          1636410 A    7/2005
CN        101022353 A    8/2007
(Continued)

OTHER PUBLICATIONS

Tencent Technology, ISRWO, PCT/CN2017072092, dated Apr. 27, 2017, 10 pgs.
(Continued)

*Primary Examiner* — John A Follansbee
*Assistant Examiner* — Raqiul A Choudhury
(74) *Attorney, Agent, or Firm* — Morgan, Lewis & Bockius LLP

(57) ABSTRACT

A method for inserting information push into a live video streaming is performed at a computer server, the method including: obtaining a bitstream of the information push, a playing time period of the information push, video identification, and a corresponding bitstream of the video; using the bitstream of the information push to replace a bitstream of the video having the same playing time period with the playing time period of the information push, and inserting the bitstream of the information push and the bitstream of the video into a same path flow; generating an information push insertion mark; and sending the video identification, the information push insertion mark, and the bitstream of the information push to a terminal of the video corresponding to the video identification. The terminal inserts the bitstream of the information push into the video corresponding to the
(Continued)

video identification according to the information push insertion mark.

15 Claims, 9 Drawing Sheets

(51) Int. Cl.
 *H04N 21/44* (2011.01)
 *H04N 21/845* (2011.01)
 *H04N 21/2187* (2011.01)
 *H04N 21/235* (2011.01)
 *H04N 21/81* (2011.01)

(52) U.S. Cl.
 CPC ..... *H04N 21/235* (2013.01); *H04N 21/44016* (2013.01); *H04N 21/8456* (2013.01); *H04N 21/812* (2013.01); *H04N 21/8126* (2013.01)

(56) References Cited

U.S. PATENT DOCUMENTS

| | | | | |
|---|---|---|---|---|
| 2008/0276269 | A1* | 11/2008 | Miller | H04N 21/47202 725/34 |
| 2011/0196749 | A1* | 8/2011 | Herlein | H04N 21/812 705/14.72 |
| 2012/0137015 | A1* | 5/2012 | Sun | H04N 21/26258 709/231 |
| 2014/0316899 | A1* | 10/2014 | McGowan | G06Q 30/0264 705/14.61 |
| 2014/0359656 | A1* | 12/2014 | Banica | H04N 21/234 725/32 |
| 2015/0074709 | A1* | 3/2015 | Berger | H04N 21/4147 725/32 |
| 2015/0128162 | A1* | 5/2015 | Ionescu | H04N 21/6125 725/14 |
| 2015/0201227 | A1* | 7/2015 | Krasko | H04N 21/2668 725/34 |
| 2015/0319510 | A1* | 11/2015 | Ould Dellahy, VIII | H04N 21/4725 725/32 |
| 2015/0379546 | A1* | 12/2015 | Vieri | G06Q 30/0224 705/14.25 |

FOREIGN PATENT DOCUMENTS

| | | |
|---|---|---|
| CN | 103686245 A | 3/2014 |
| CN | 103686455 A | 3/2014 |
| CN | 104010198 A | 8/2014 |
| CN | 104735482 A | 6/2015 |
| CN | 104811774 A | 7/2015 |
| CN | 105704504 A | 6/2016 |
| JP | 2002544609 A | 12/2002 |
| JP | 2005525010 A | 8/2005 |
| JP | 2007511160 A | 4/2007 |
| JP | 2010504044 A | 2/2010 |
| JP | 2010154523 A | 7/2010 |
| JP | 2011501266 A | 1/2011 |
| JP | 2012504916 A | 2/2012 |
| JP | 2012514276 A | 6/2012 |
| JP | 2014509109 A | 4/2014 |
| JP | 2016536925 A | 11/2016 |

OTHER PUBLICATIONS

Tencent Technology, IPRP, PCT/CN2017072092, dated Jul. 31, 2018, 8 pgs.

* cited by examiner ent of a method for inserting information push into a live video streaming in an embodiment;
METHOD FOR INSERTING INFORMATION PUSH INTO LIVE VIDEO STREAMING, SERVER, AND TERMINAL

PRIORITY CLAIM AND RELATED APPLICATION

This application is a continuation-in-part application of PCT/CN2017/072092, entitled "METHOD FOR INSERTING INFORMATION PUSH INTO LIVE VIDEO STREAMING, SERVER, AND TERMINAL" filed on Jan. 22, 2017, which claims priority to Chinese Patent Application No. 201610059652.1, entitled "METHOD AND APPARATUS FOR INSERTING NOTIFICATIONS PUSH INTO LIVE VIDEO STREAMING" filed on Jan. 28, 2016, all of which are incorporated by reference in their entirety.

FIELD OF THE TECHNOLOGY

The present disclosure relates to the field of video processing, and in particular, to a method for inserting information push into a live video streaming, a server, and a terminal.

BACKGROUND OF THE DISCLOSURE

With the development of computer technologies and network technologies, there are increasing users engaging in social activities, such as communicating, watching videos, or shopping online by using the network. To spread information more conveniently, information push is usually added at the beginning of video playing to implement spreading of the information push in the video playing. With the rapid development of a live video streaming, more and more users watch the live video streaming. However, a way to spread the information push is wasted for failing to add the information push during the live video streaming.

SUMMARY

A method for inserting information push into a live video streaming, a server, and a terminal are provided according to embodiments of the present disclosure.

One aspect of the present disclosure is directed to a method for inserting information push into a live video streaming performed at a computer server having one or more processors and memory storing one or more programs to be executed by the one or more processors, the method comprising:
  obtaining a bitstream of the information push, a playing time period of the information push, video identification, and a corresponding bitstream of the video;
  using the bitstream of the information push to replace a bitstream of the video having the same playing time period with the playing time period of the information push, and inserting the bitstream of the information push and the bitstream of the video into a same path flow;
  generating an information push insertion mark; and
  sending the video identification, the information push insertion mark, and the bitstream of the information push to a terminal of the video corresponding to the video identification, wherein the terminal is configured to insert the bitstream of the information push into the video corresponding to the video identification according to the information push insertion mark.

Another aspect of the present disclosure is directed to a computer server having one or more processors, memory and one or more programs stored in the memory that, when executed by the one or more processors, cause the computer server to perform the aforementioned method for inserting information push into a live video streaming.

Yet another aspect of the present disclosure is directed to a non-transitory computer readable storage medium storing one or more programs, wherein the one or more programs, when executed by a computer server having one or more processors, cause the computer server to perform the aforementioned method for inserting information push into a live video streaming.

Details of one or more embodiments of the present disclosure are proposed in the following accompanying drawings and descriptions. Other characteristics, purposes, and advantages of the present disclosure may be obvious in the specification, accompanying drawings, and claims.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the specific embodiments described herein are merely used to explain the present disclosure but are not intended to limit the present disclosure.

Figure 1:
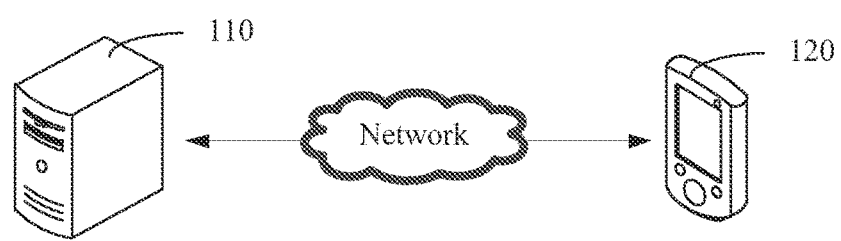
FIG. 1 is a schematic diagram of an application environment of a method for inserting information push into a live video streaming in an embodiment.

FIG. 1 is a schematic diagram of an application environment of a method for inserting information push into a live video streaming in an embodiment. As shown in FIG. 1, the application environment includes a server 110 and a terminal 120. The terminal 120 communicates with the server 110.

The server 110 obtains a bitstream of a video in the live video streaming and sends the bitstream of the video to the terminal 120, and performs a live broadcast on the terminal 120 according to the bitstream of the video. The live video streaming refers to perform the live broadcast by using Internet and a streaming media technology. An implementation process of the live video streaming is: when a user sends a live broadcast request, the server 110 sends a playing address of the live video streaming to the user according to live broadcast information, and the user joins a corresponding multicast group according to the playing address to receive the bitstream of the video in the live video streaming.

To insert the information push into the live video streaming, the server 110 obtains the bitstream of the information push, video identification, and a corresponding bitstream of the video, and compresses the bitstream of the information push and the bitstream of the video into a same path flow. The server 110 obtains a playing time period of the information push when the information push is determined to play, and uses the bitstream of the information push to replace a bitstream of the video having the same playing time period with the playing time period of the information push, and generates an information push insertion mark, so as to send the video identification, the information push insertion mark, and the bitstream of the information push to the terminal 120 that plays the video corresponding to the video identification.

The information push may be advertisements, activity information, or stock information, which is not limited herein.

In one embodiment, the server 110 adds an information push insertion field into an extended field (EXT-X-PROGRAM-DATE-TIME) of an Http Live Streaming (HLS) protocol, and uses the information push insertion field as the information push insertion mark.

The server 110 sends the bitstream of the information push to all terminal 120 playing the video corresponding to the video identification.

The terminal 120 obtains the video identification and corresponding video data; and determines whether the video data includes the information push insertion mark; if the video data includes the information push insertion mark, the terminal 120 obtains the bitstream of the information push that replaces the bitstream of the video and the playing time period of the information push from the server 110 according to the video identification; initiates an information push insertion request and inserts the bitstream of the information push into the video corresponding to the video identification; and displays the playing time period of the information push when inserting the bitstream of the information push and starts a countdown of the play time period. The terminal 120 plays the bitstream of the video when playing the bitstream of the information push and does not output image and voice information of the bitstream of the video. The terminal 120 goes on playing the bitstream of the video after playing the bitstream of the information push and outputs the image and voice information of the bitstream of the video.

The terminal 120 is further configured to obtain response information when inserting the bitstream of the information push, where the response information includes user behavior data and data of the user, and upload the response information to the server 110 to store. The user behavior data may include triggering operation records or times of triggering operation generated for watching the information push by the user. The data of the user may include one or more of a user identity, a device identity for the user identity to log in, a website address, and so on.

Furthermore, when there is no user interface (User Interface, UI) that processed the information push displaying on the terminal 120, the server 110 may draw the user interface of the information push and send the user interface of the information push to the terminal 120. The server 110 may dynamically configure playing of the bitstream of the information push, which is of high flexibility and adaptability, applicable to all playing terminal 120.

Figure 2:
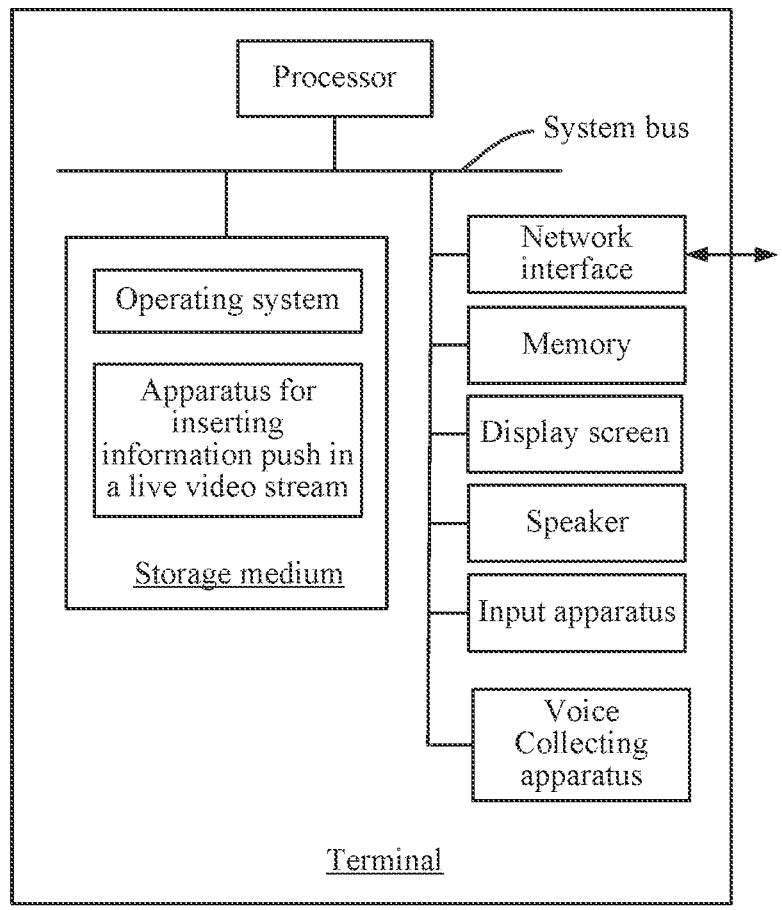
FIG. 2 is a schematic internal structural diagram of a terminal in an embodiment.

FIG. 2 is a schematic internal structural diagram of a terminal in an embodiment. As shown in FIG. 2, the terminal includes a processor connected with a system bus, a non-transitory computer readable storage medium, memory, a network interface, a voice collecting apparatus, a display screen, a speaker, and an input apparatus. The storage medium of the terminal stores an operating system, further including an apparatus for inserting information push into a live video streaming. The apparatus for inserting information push into a live video streaming is configured to implement a method for inserting information push into a live video streaming. The processor is configured to provide a computing and control capacity to support running of the whole terminal. The memory in the terminal provides environment for running of the apparatus for inserting information push into a live video streaming in the storage medium. The network interface is configured to perform network communication with the server, such as sending a live video streaming request to the server, receiving a bitstream of a video and a bitstream of the information push returned by the server, and the like. The display screen of the terminal may be a liquid crystal display screen or an electronic ink display screen. The input apparatus may be a touch layer covered on the display screen, a button, a track ball, or a touchpad set on a housing of the terminal, or an external keyboard, touchpad, or mouse. The terminal may be phones, laptops, or personal digital assistants. A person of ordinary skill in the art may understand that a structure shown in FIG. 2 is merely a block diagram of part structure related to the solution of this application, and is not limited to the foregoing terminal applied in the solution of this application. A specific terminal may include more or less parts, combination of some parts, or different part layouts than what is shown in the figure.

Figure 3:
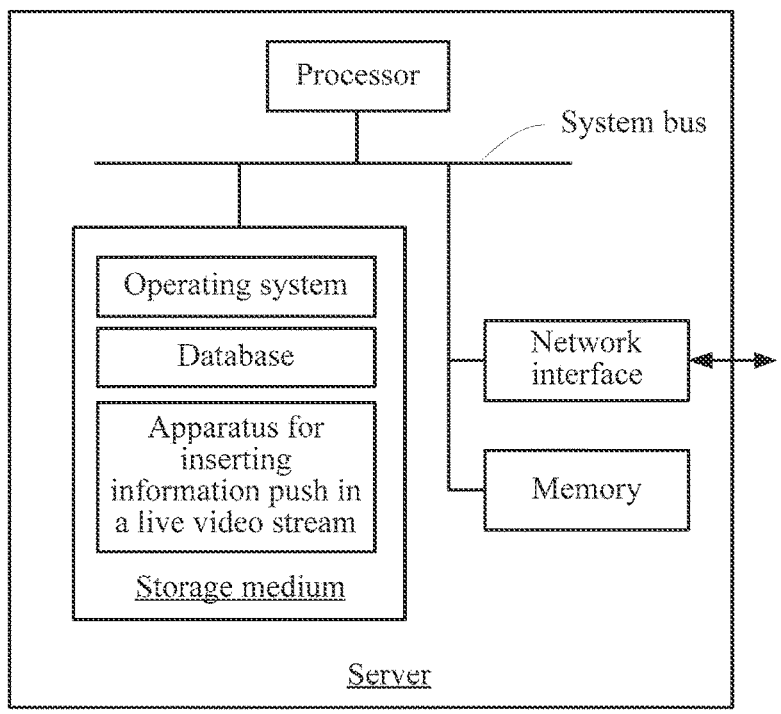
FIG. 3 is a schematic internal structural diagram of a server in an embodiment.

FIG. 3 is a schematic internal structural diagram of a computer server in an embodiment. As shown in FIG. 3, the server includes a processor connected with a system bus, a non-transitory computer readable storage medium, memory, and a network interface. The storage medium of the server stores an operating system, a database, and an apparatus for inserting information push into a live video streaming. The database stores a bitstream of a video and a bitstream of the information push. The apparatus for inserting information push into a live video streaming is configured to implement a method applicable to the server for inserting information push into a live video streaming. The processor of the server is configured to provide a computing and control capacity to support running of the whole server. The memory in the server provides environment for running of the apparatus for inserting information push into a live video streaming in the storage medium. The display screen of the server may be a liquid crystal display screen or an electronic ink display screen. The input apparatus may be a touch layer covered on the display screen, a button, a track ball, or a touchpad set on a housing of the terminal, or an external keyboard, touchpad, or mouse. The network interface of the server is configured to perform network communication with the external terminal, such as receiving an information push insertion request sent by the terminal in a live video streaming, returning the bitstream of the video and the bitstream of the information push to the terminal, and the like. The server may be implemented by an independent server or a server cluster combined by multiple servers. A person of ordinary skill in the art may understand that a structure shown in FIG. 3 is merely a block diagram of part structure related to the solution of this application, and is not limited to the foregoing server applied in the solution of this application. A specific server may include more or less parts, combination of some parts, or different part layouts than what is shown in the figure.

Figure 4:
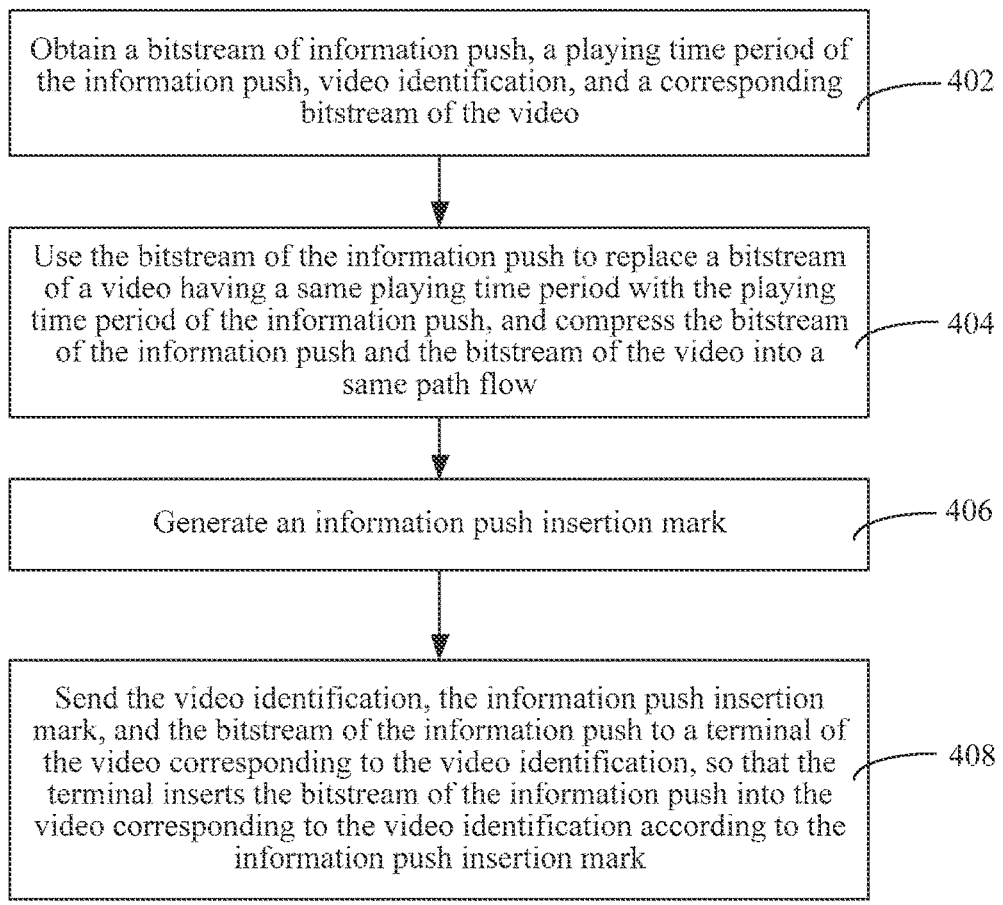
FIG. 4 is a flowchart of a method for inserting information push into a live video streaming in an embodiment.

FIG. 4 is a flowchart of a method for inserting information push into a live video streaming in an embodiment. As shown in FIG. 4, a method for inserting information push into a live video streaming, described in terms of a server, includes the following operations:

Operation 402: Obtain a bitstream of the information push, a playing time period of the information push, video identification, and a corresponding bitstream of the video;

Specifically, the video identification is used for representing uniqueness of the live video streaming and may be obtained by distribution of the server or pre-application. For example, video identification of a television source video may be a television frequency. Video identification of an anchor video may be a room number.

Operation 404: Use the bitstream of the information push to replace a bitstream of the video having the same playing time period with the playing time period of the information push, and compress the bitstream of the information push and the bitstream of the video into a same path flow.

Specifically, inserting the bitstream of the information push and the bitstream of the video into the same path flow when playing on the terminal to implement seamless alliance of the video and the information push without distinguishing the video and the information push.

The playing time period of the information push refers to a time period of information push content, for example, 30 seconds or 60 seconds.

Operation 406: Generate an information push insertion mark.

The operation of generating an information push insertion mark includes: adding an information push insertion field into an extended field of an Http Live Streaming (HLS) protocol, and using the information push insertion field as the information push insertion mark. The extended field of HLS interacts with the terminal by adding the information push insertion field, which is very extensive.

Operation 408: Send the video identification, the information push insertion mark, and the bitstream of the information push to a terminal of the video corresponding to the video identification, so that the terminal inserts the bitstream of the information push into the video corresponding to the video identification according to the information push insertion mark.

The method for inserting information push into a live video streaming includes inserting the bitstream of the information push and the bitstream of the video into a same path flow, and using the bitstream of the information push to replace a bitstream of the video having the same playing time period with the playing time period of the information push; generating an information push insertion mark; sending the video identification, the information push insertion mark, and the bitstream of the information push to a terminal; inserting the bitstream of the information push into the video played on the terminal, so as to implement inserting the information push into the live video streaming and increase ways to spread the information push.

In one embodiment, the foregoing method for inserting information push into a live video streaming further includes drawing a user interface of the information push according to the bitstream of the information push and sending the user interface of the information push to the terminal for display.

Specifically, the server draws a user interface of the information push according to the bitstream of the information push and directly and sends the user interface of the information push to the terminal for display without drawing by the terminal, so as to reduce development workload of a playing client on the terminal and play the information push on any playing client.

Moreover, the server obtains the playing time period of the information push when drawing the user interface of the information push according to the bitstream of the information push; displays the playing time period of the information push in the user interface of the information push; and displays a countdown of the play time period. After inserting the bitstream of the information push, the server sends the bitstream of the video to the terminal for display.

In one embodiment, the foregoing method for inserting information push into a live video streaming further includes receiving response information uploaded by the terminal when inserting the bitstream of the information push, where the response information includes user behavior data and data of the user; and storing the response information. The user behavior data may include triggering operation records or times of triggering operation generated for watching the information push by the user. The data of the user may include one or more of a user identity, a device identity for the user identity to log in, a website address, and so on. The user identity is used to distinguish uniqueness of the user identity. The user identity may be an account registered by the user, an instant messaging account, an e-mail, or a phone number. The user behavior data and the data of the user may be stored to conveniently perform a follow-up analysis of a response of the user to the information push.

Figure 5:
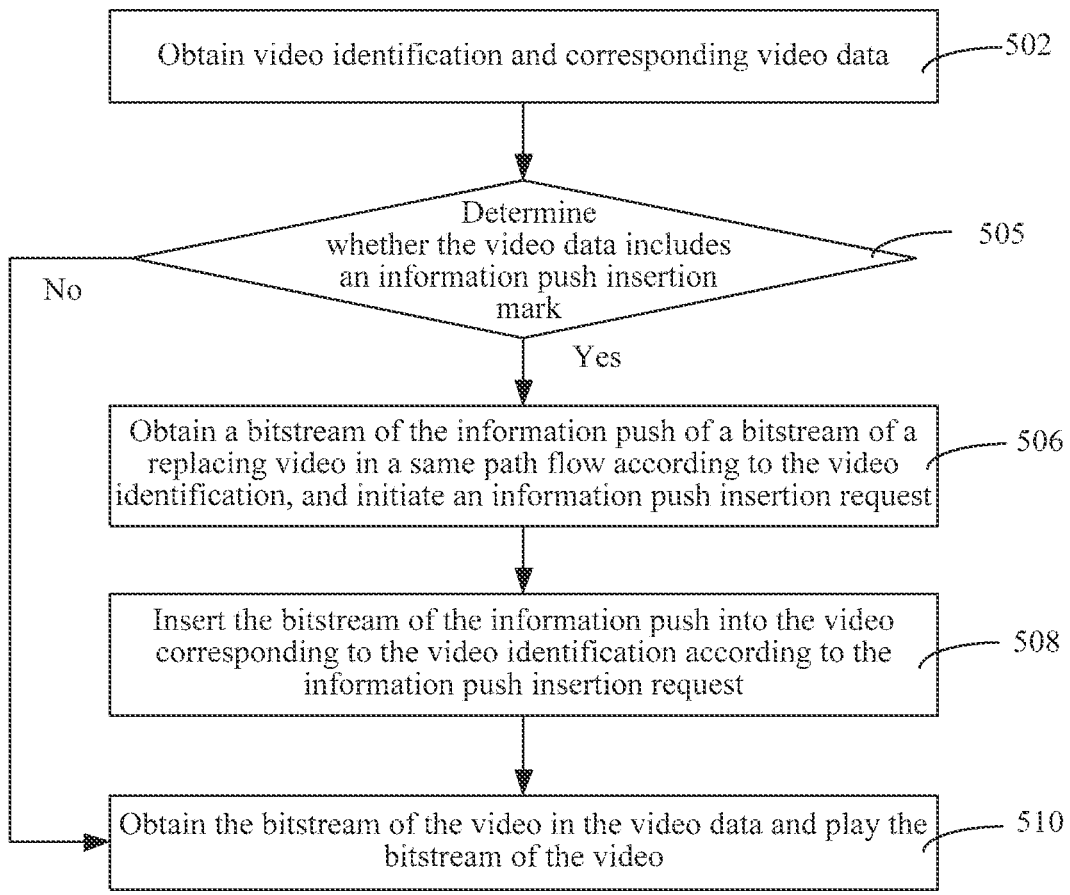
FIG. 5 is a flowchart of a method for inserting information push into a live video streaming in an embodiment.

FIG. 5 is a flowchart of a method for inserting information push into a live video streaming in an embodiment. As shown in FIG. 5, a method for inserting information push into a live video streaming, described in terms of a terminal, includes the following operations:

Operation 502: Obtain video identification and corresponding video data.

Specifically, the video identification is used for representing uniqueness of the live video streaming and may be obtained by distribution of the server or pre-application. For example, video identification of a television source video may be a television frequency. Video identification of an anchor video may be a room number. The terminal obtains the video identification and the corresponding video data from the server.

Operation 504: Determine whether the video data includes an information push insertion mark; if yes, perform operation 506; if no, perform operation 510.

In the embodiment, the information push insertion mark is an information push insertion field.

The operation of determining whether the video data includes information push insertion mark includes: determining whether an extended field of an Http Live Streaming (HLS) protocol includes the information push insertion field.

Operation 506: Obtain a bitstream of the information push of a bitstream of a replacing video in a same path flow according to the video identification, and initiate an information push insertion request.

Specifically, first compress the bitstream of the information push and the bitstream of the video into a same path flow. The terminal reads the information push insertion mark when reading the video data, and obtains the bitstream of the information push that replaces the bitstream of the video from the same path flow and initiates the information push insertion request.

Operation 508: Insert the bitstream of the information push into the video corresponding to the video identification according to the information push insertion request. After inserting the bitstream of the information push, operation 510 is performed.

Specifically, a video playing module of the terminal plays the video corresponding to the video identification, and an information push insertion module inserts the bitstream of the information push. When the information push insertion module inserts the bitstream of the information push, the video played by the video playing module does not output images or voices.

Operation 510: Obtain the bitstream of the video in the video data and play the bitstream of the video.

Specifically, obtain the bitstream of the video in the video data and play the bitstream of the video when there is no information push insertion mark or after inserting the bitstream of the information push.

The method for inserting information push into a live video streaming obtains the bitstream of the information push after determining that the video data includes the information push insertion mark, and inserting the bitstream of the information push in the video, so as to implement inserting the information push into the live video streaming and increase ways to spread the information push.

In one embodiment, the foregoing method for inserting information push into a live video streaming further includes: obtaining a playing time period of the information push; displaying the playing time period of the information push when inserting the bitstream of the information push; and starting a countdown of the play time period.

Specifically, the playing time period of the information push refers to a time period of information push content, for example, 30 seconds or 60 seconds. When inserting the bitstream of the information push, display the playing time period of the information push and start a countdown of the play time period, so that the user may conveniently learn the playing time period of the information push and a rest time period.

In one embodiment, the foregoing method for inserting information push into a live video streaming further includes obtaining response information when inserting the bitstream of the information push, where the response information includes user behavior data and data of the user; and uploading the response information.

The user behavior data may include triggering operation records or times of triggering operation generated for watching the information push by the user. The data of the user may include one or more of a user identity, a device identity for the user identity to log in, a website address, and so on.

An implementation process of the method for inserting information push into a live video streaming is described with reference to a specific application scenery. Take a live video streaming of a basketball match as an example, and the method for inserting information push into a live video streaming includes:

(1) obtaining a bitstream of the information push, a playing time period of the information push, basketball match identification, and a bitstream of a basketball match video.

(2) using the bitstream of the information push to replace a bitstream of the video having the same playing time period with the playing time period of the information push, and inserting the bitstream of the information push and the bitstream of the video into a same path flow.

Figure 6:
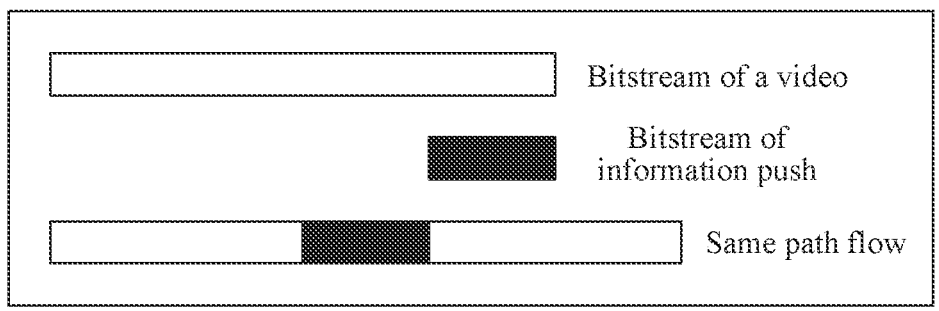
FIG. 6 is a schematic diagram of compressing a bitstream of information push and a bitstream of a video into a same path flow.

As shown in FIG. 6, compress a bitstream of information push and a bitstream of a video into a same path flow. Replace the bitstream of the information push into a cheering squad dancing time period or other time period in the bitstream of the video.

(3) adding an information push insertion field into an extended field of an Http Live Streaming (HLS) protocol, and using the information push insertion field as the information push insertion mark.

(4) sending the basketball match identification, the information push insertion mark, and the bitstream of the information push to a terminal of a video corresponding to the basketball match identification.

(5) reading, by the terminal, the video data; determining that the video data includes the information push insertion mark; obtaining the bitstream of the information push that replaces the bitstream of the video; initiating the information push insertion request; and inserting the bitstream of the information push when playing the video.

Figure 7:
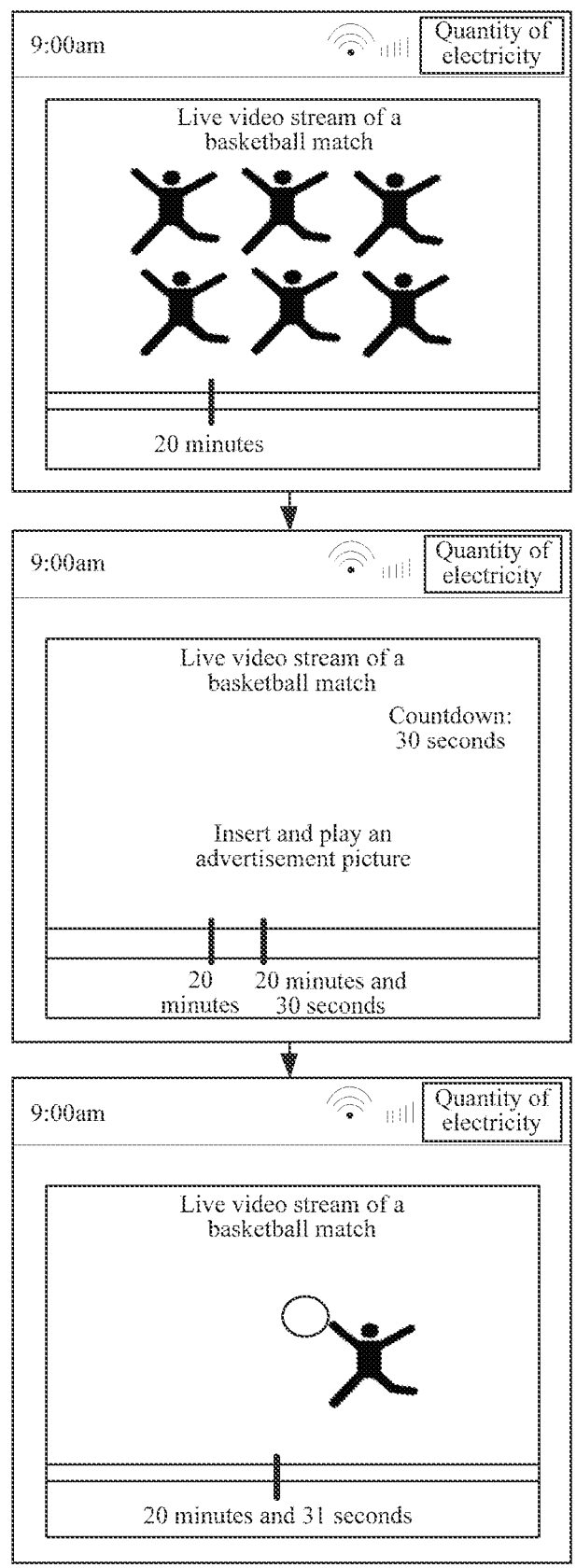
FIG. 7 is a schematic diagram of a process of displaying information push insertion on a terminal.

FIG. 7 is a schematic diagram of a process of displaying information push insertion on a terminal. As shown in FIG. 7, when the terminal plays the video of the basketball match, determining that the video data includes the information push insertion mark; inserting the bitstream of the information push that replaces the bitstream of the video; playing the bitstream of the video after inserting the bitstream of the information push.

Figure 8:
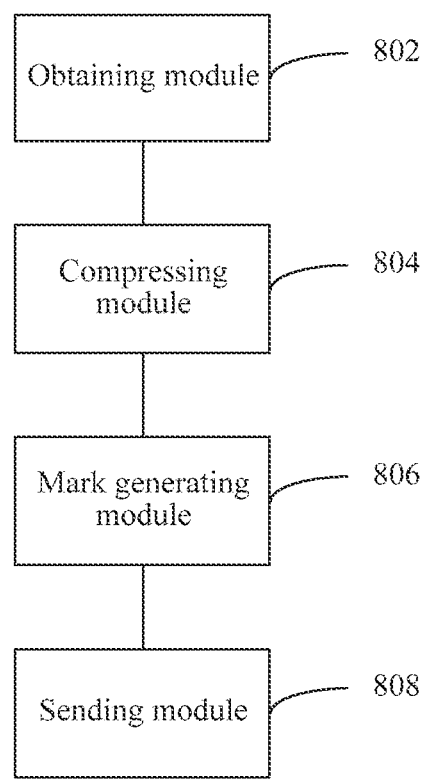
FIG. 8 is a structural block diagram of an apparatus for inserting information push into a live video streaming in an embodiment.

FIG. 8 is a structural block diagram of an apparatus for inserting information push into a live video streaming in an embodiment. As shown in FIG. 8, an apparatus for inserting information push in a live video stream, described in terms of a server, includes an obtaining module 802, a compressing module 804, a mark generating module 806, and a sending module 808.

The obtaining module 802 is configured to obtain a bitstream of the information push, a playing time period of the information push, video identification, and a corresponding bitstream of the video.

Specifically, the video identification is used for representing uniqueness of the live video streaming and may be obtained by distribution of the server or pre-application. For example, video identification of a television source video may be a television frequency. Video identification of an anchor video may be a room number.

The compressing module 804 is configured to use the bitstream of the information push to replace a bitstream of the video having the same playing time period with the playing time period of the information push, and compress the bitstream of the information push and the bitstream of the video into a same path flow.

Specifically, inserting the bitstream of the information push and the bitstream of the video into the same path flow when playing on the terminal to implement seamless alliance of the video and the information push without distinguishing the video and the information push.

The playing time period of the information push refers to a time period of information push content, for example, 30 seconds or 60 seconds.

The mark generating module 806 is configured to generate an information push insertion mark.

In the embodiment, the mark generating module 806 is further configured to add an information push insertion field into an extended field of an Http Live Streaming (HLS) protocol, and use the information push insertion field as the information push insertion mark.

The sending module 808 is configured to send the video identification, the information push insertion mark, and the bitstream of the information push to a terminal of the video corresponding to the video identification, so that the terminal inserts the bitstream of the information push into the video corresponding to the video identification according to the information push insertion mark.

The apparatus for inserting information push into a live video streaming includes inserting the bitstream of the information push and the bitstream of the video into a same path flow, and using the bitstream of the information push to replace a bitstream of the video having the same playing time period with the playing time period of the information push; generating an information push insertion mark; sending the video identification, the information push insertion mark, and the bitstream of the information push to a terminal; inserting the bitstream of the information push into the video played on the terminal, so as to implement inserting the information push into the live video streaming and increase ways to spread the information push.

Figure 9:
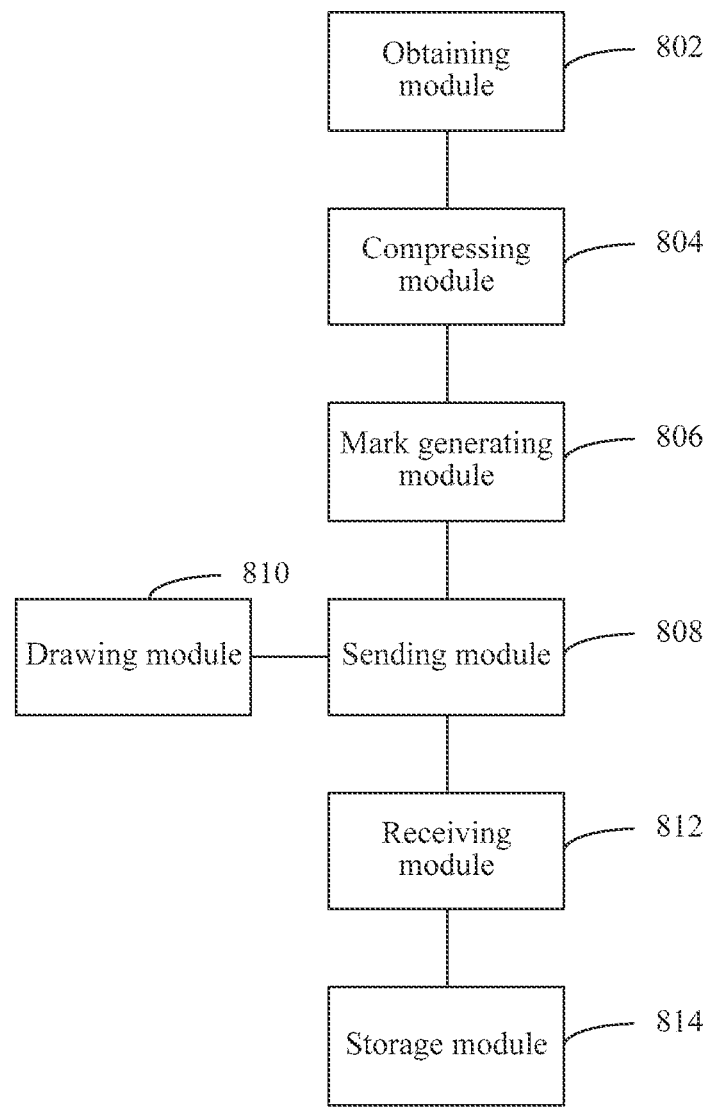
FIG. 9 is a structural block diagram of an apparatus for inserting information push into a live video streaming in another embodiment.

FIG. 9 is a structural block diagram of an apparatus for inserting information push into a live video streaming in another embodiment. As shown in FIG. 9, an apparatus for inserting information push in a live video stream, described in terms of a server, includes an obtaining module 802, a compressing module 804, a mark generating module 806, and a sending module 808, and further includes a drawing module 810, a receiving module 812, and a storage module 814.

The drawing module 810 is configured to draw a user interface of the information push according to the bitstream of the information push.

Specifically, the server draws the user interface of the information push according to the bitstream of the information push and directly and sends the user interface of the information push to the terminal for display without drawing by the terminal, so as to reduce development workload of a playing client on the terminal and play the information push on any playing client.

The sending module 808 is further configured to send the user interface of the information push to the terminal for display.

Furthermore, the drawing module 810 is further configured to obtain the playing time period of the information push; display the playing time period of the information push in the user interface of the information push; and display a countdown of the play time period.

The receiving module 812 is configured to receive response information uploaded by the terminal when inserting the bitstream of the information push, where the response information includes user behavior data and data of the user.

The user behavior data may include triggering operation records or times of triggering operation generated for watching the information push by the user. The data of the user may include one or more of a user identity, a device identity for the user identity to log in, a website address, and so on.

The storage module 814 is configured to store the response information. The user behavior data and the data of the user may be stored to conveniently perform a follow-up analysis of a response of the user to the information push.

Figure 10:
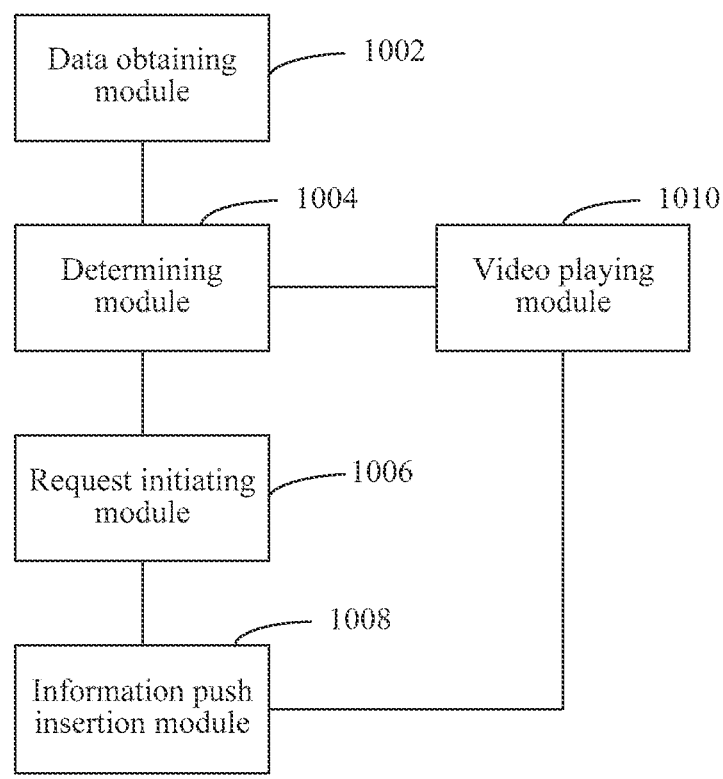
FIG. 10 is a structural block diagram of an apparatus for inserting information push into a live video streaming in another embodiment.

FIG. 10 is a structural block diagram of an apparatus for inserting information push into a live video streaming in another embodiment. As shown in FIG. 10, an apparatus for inserting information push in a live video stream includes a data obtaining module 1002, a determining module 1004, a request initiating module 1006, and an information push insertion module 1008.

The data obtaining module 1002 is configured to obtain video identification and corresponding video data.

Specifically, the video identification is used for representing uniqueness of the live video streaming and may be obtained by distribution of the server or pre-application. For example, video identification of a television source video may be a television frequency. Video identification of an anchor video may be a room number. The terminal obtains the video identification and the corresponding video data from the server.

The determining module 1004 is configured to determine whether the video data includes an information push insertion mark.

The information push insertion mark is an information push insertion field.

The determining module 1004 is further configured to determine whether an extended field of an Http Live Streaming (HLS) protocol in the video data includes the information push insertion field.

The data obtaining module 1002 is further configured to obtain the bitstream of the information push that replaces the bitstream of the video according to the video identification if the video data includes the information push insertion mark.

The request initiating module 1006 is configured to initiate an information push insertion request.

The information push insertion module 1008 is configured to insert the bitstream of the information push into the video corresponding to the video identification according to the information push insertion request.

Moreover, the foregoing apparatus for inserting information push into a live video streaming further includes a video playing module 1010. The data obtaining module 1002 obtains the bitstream of the video in the video data and the video playing module 1010 is configured to play the bitstream of the video when there is no information push insertion mark or after inserting the bitstream of the information push.

The apparatus for inserting information push into a live video streaming obtains the bitstream of the information push after determining that the video data includes the information push insertion mark, and inserting the bitstream of the information push in the video, so as to implement inserting the information push into the live video streaming and increase ways to spread the information push.

Figure 11:
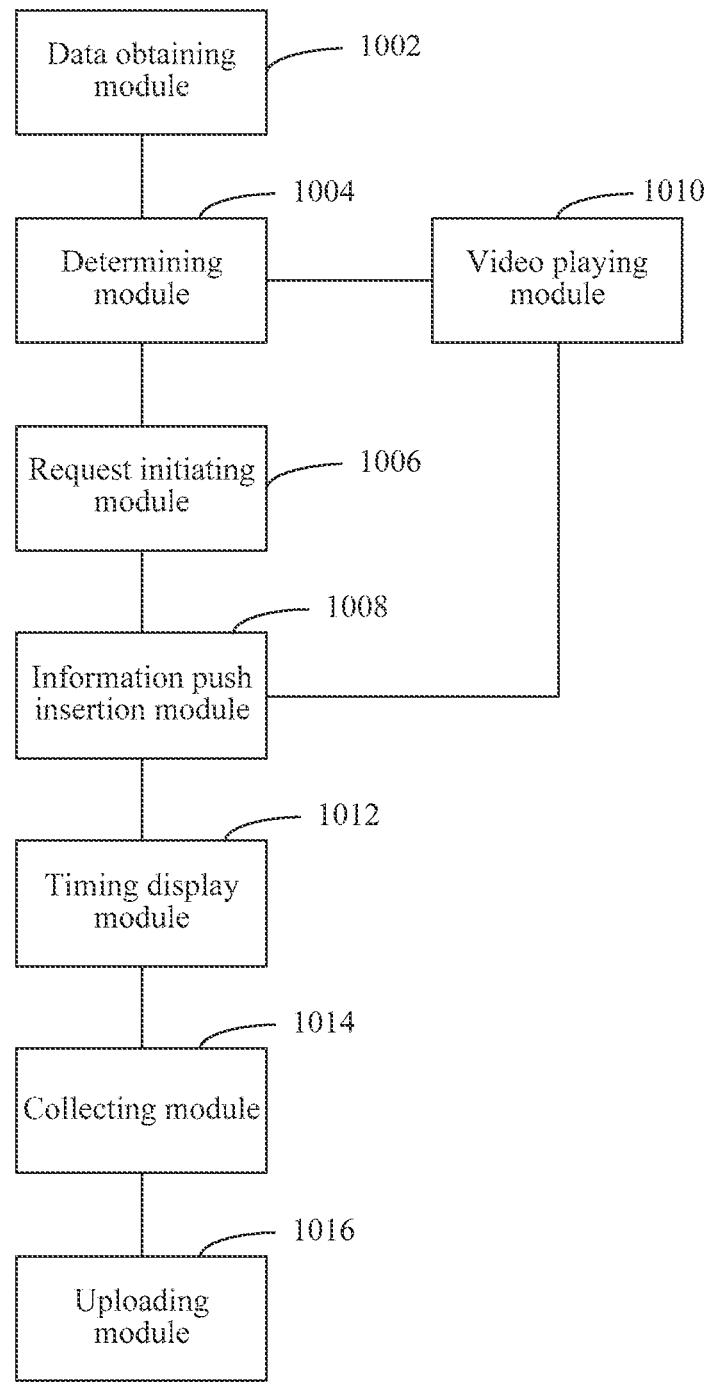
FIG. 11 is a structural block diagram of an apparatus for inserting information push into a live video streaming in another embodiment.

FIG. 11 is a structural block diagram of an apparatus for inserting information push into a live video streaming in another embodiment. As shown in FIG. 11, an apparatus for inserting information push in a live video stream includes a data obtaining module 1002, a determining module 1004, a request initiating module 1006, an information push insertion module 1008, a video playing module 1010, and further includes a timing display module 1012, a collecting module 1014, and an uploading module 1016.

The data obtaining module 1002 is further configured to obtain a playing time period of the information push.

The timing display module 1012 is configured to display the playing time period of the information push when inserting bitstream of the information push, and start a countdown of the play time period.

The receiving module 1014 is configured to obtain response information when inserting the bitstream of the information push, where the response information includes user behavior data and data of the user.

The storage module 1016 is configured to upload the response information.

The user behavior data may include triggering operation records or times of triggering operation generated for watching the information push by the user. The data of the user may include one or more of a user identity, a device identity for the user identity to log in, a website address, and so on.

A person of ordinary skill in the art may understand that all or some of the processes of the methods in the foregoing embodiments may be implemented by a computer program instructing relevant hardware. The program may be stored in a non-volatile computer readable storage medium. When the program is executed, processes of the foregoing method embodiments may be performed. The storage medium may be a magnetic disk, an optical disc, a read-only memory (Read-Only Memory, ROM), or the like.

The described embodiments are merely some embodiments of the present disclosure, which are specifically described in detail. However, it should not be understood as a limitation to the patent scope of the present disclosure. It should be noted that, persons of ordinary skill in the art may further make some variations and improvements without departing from the concept of the present disclosure, and the variations and improvements belong to the protection scope of the present disclosure. Therefore, the protection scope of the present disclosure shall be subject to the protection scope of the appended claims.

What is claimed is:

1. A method for inserting advertisements into live video streams, the method performed at a computer server having one or more processors and memory storing one or more programs to be executed by the one or more processors, the method comprising:
   receiving, from a mobile terminal that is playing a live video stream originated from a content providing source, a request for an advertisement to be inserted into the play of the live video stream, the request including a time period parameter for playing the advertisement and the advertisement includes activity information and stock information responsive to the request, wherein the time period parameter is extracted from the live video stream;
   in response to the request:
      obtaining an advertisement bitstream corresponding to the advertisement that includes the activity information and the stock information, a playing time period of the advertisement bitstream, and video identification of the live video stream, the advertisement bitstream including a first video stream of the activity information and the stock information and an accompanying audio stream;
      identifying a bitstream in the live video stream corresponding to the advertisement bitstream at the time period parameter, wherein the corresponding bitstream in the live video stream has a same playing time period as the playing time period of the advertisement;
      generating an advertisement insertion mark for the advertisement bitstream according to the time period parameter;
      modifying the live video stream by replacing the identified bitstream in the live video stream with the advertisement bitstream according to the advertisement insertion mark; and
      sending the video identification of the modified live video stream, the advertisement insertion mark, and the playing time period of the advertisement bitstream to the mobile terminal of the live video stream corresponding to the video identification, wherein the mobile terminal is configured to:
         obtain the advertisement insertion mark and the playing time period of the advertisement bitstream;
         render a user interface of playing the advertisement bitstream embedded in the live video stream according to the advertisement insertion mark;
         simultaneously play the bitstream of the live video stream and the advertisement bitstream on the mobile terminal while only outputting the first video stream and the accompanying audio stream of the advertisement bitstream;
         display the playing time period of the advertisement bitstream in the user interface of the advertisement; and
         display a countdown of the playing time period in the user interface as an indicator of when the live video stream is to be resumed, wherein resuming the live video stream comprises playing the bitstream of the live video stream and only outputting image and voice information of the bitstream of the live video stream;
   obtaining, from the mobile terminal, user behavior data that is generated by a user of the mobile terminal from interacting with the advertisement bitstream, the user behavior data including triggering operation records or a number of times of triggering operation generated from watching the advertisement bitstream; and
   in response to a subsequent request from the mobile terminal for another advertisement, identifying a second advertisement based on the user behavior data to be displayed at the mobile terminal.

2. The method according to claim 1, wherein the generating the advertisement insertion mark comprises:
   adding an advertisement insertion field into an extended field of an Http Live Streaming (HLS) protocol; and
   using the advertisement insertion field as the advertisement insertion mark.

3. The method according to claim 1, further comprising:
   generating the user interface of playing the advertisement bitstream; and
   sending the user interface to the mobile terminal for display.

4. The method according to claim 1, further comprising:
   obtaining, from the mobile terminal, data associated with the user; and
   storing the data.

5. The method according to claim 4, wherein the data associated with the user includes one or more of a user identity, a device identity for the user identity to log in, and a website address.

6. A computer server having one or more processors, memory and one or more programs stored in the memory that, when executed by the one or more processors, cause the computer server to perform a plurality of operations comprising:

receiving, from a mobile terminal that is playing a live video stream originated from a content providing source, a request for an advertisement to be inserted into the play of the live video stream, the request including a time period parameter for playing the advertisement and the advertisement includes activity information and stock information responsive to the request, wherein the time period parameter is extracted from the live video stream;

in response to the request:

obtaining an advertisement bitstream corresponding to the advertisement that includes the activity information and the stock information, a playing time period of the advertisement bitstream, and video identification of the live video stream, the advertisement bitstream including a first video stream of the activity information and the stock information and an accompanying audio stream;

identifying a bitstream in the live video stream corresponding to the advertisement bitstream at the time period parameter, wherein the corresponding bitstream in the live video stream has a same playing time period as the playing time period of the advertisement;

generating an advertisement insertion mark for the advertisement bitstream according to the time period parameter;

modifying the live video stream by replacing the identified bitstream in the live video stream with the advertisement bitstream according to the advertisement insertion mark; and sending the video identification of the modified live video stream, the advertisement insertion mark, and the playing time period of the advertisement bitstream to the mobile terminal of the live video stream corresponding to the video identification, wherein the mobile terminal is configured to:

obtain the advertisement insertion mark and the playing time period of the advertisement bitstream;

render a user interface of playing the advertisement bitstream embedded in the live video stream according to the advertisement insertion mark;

simultaneously play the bitstream of the live video stream and the advertisement bitstream on the mobile terminal while only outputting the first video stream and the accompanying audio stream of the advertisement bitstream;

display the playing time period of the advertisement bitstream in the user interface of the advertisement; and display a countdown of the playing time period in the user interface as an indicator of when the live video stream is to be resumed, wherein resuming the live video stream comprises playing the bitstream of the live video stream and only outputting image and voice information of the bitstream of the live video stream;

obtaining, from the mobile terminal, user behavior data that is generated by a user of the mobile terminal from interacting with the advertisement bitstream, the user behavior data including triggering operation records or a number of times of triggering operation generated from watching the advertisement bitstream; and in response to a subsequent request from the mobile terminal for another advertisement, identifying a second advertisement based on the user behavior data to be displayed at the mobile terminal.

7. The computer server according to claim 6, wherein the operation of generating the advertisement insertion mark comprises:

adding an advertisement insertion field into an extended field of an Http Live Streaming (HLS) protocol; and using the advertisement insertion field as the advertisement mark.

8. The computer server according to claim 6, wherein the plurality of operations further comprise:

generating the user interface of playing the advertisement bitstream; and sending the user interface to the mobile terminal for display.

9. The computer server according to claim 6, wherein the plurality of operations further comprise:

obtaining, from the mobile terminal, data associated with the user; and storing the data.

10. The computer server according to claim 9, wherein the data associated with the user includes one or more of a user identity, a device identity for the user identity to log in, and a website address.

11. A non-transitory computer readable storage medium storing one or more programs, wherein the one or more programs, when executed by a computer server having one or more processors, cause the computer server to perform a plurality of operations comprising:

receiving, from a mobile terminal that is playing a live video stream originated from a content providing source, a request for an advertisement to be inserted into the play of the live video stream, the request including a time period parameter for playing the advertisement and the advertisement includes activity information and stock information responsive to the request, wherein the time period parameter is extracted from the live video stream;

in response to the request:

obtaining an advertisement bitstream corresponding to the advertisement that includes the activity information and the stock information, a playing time period of the advertisement bitstream, and video identification of the live video stream, the advertisement bitstream including a first video stream of the activity information and the stock information and an accompanying audio stream;

identifying a bitstream in the live video stream corresponding to the advertisement bitstream at the time period parameter, wherein the corresponding bitstream in the live video stream has a same playing time period as the playing time period of the advertisement;

generating an advertisement insertion mark for the advertisement bitstream according to the time period parameter;

modifying the live video stream by replacing the identified bitstream in the live video stream with the advertisement bitstream according to the advertisement insertion mark; and sending the video identification of the modified live video stream, the advertisement insertion mark, and the playing time period of the advertisement bitstream to the mobile terminal of the live video stream corresponding to the video identification, wherein the mobile terminal is configured to:
obtain the advertisement insertion mark and the playing time period of the advertisement bitstream;
render a user interface of playing the advertisement bitstream embedded in the live video stream according to the advertisement insertion mark;
simultaneously play the bitstream of the live video stream and the advertisement bitstream on the mobile terminal while only outputting the first video stream and the accompanying audio stream of the advertisement bitstream;
display the playing time period of the advertisement bitstream in the user interface of the advertisement; and
display a countdown of the playing time period in the user interface as an indicator of when the live video stream is to be resumed, wherein resuming the live video stream comprises playing the bitstream of the live video stream and only outputting image and voice information of the bitstream of the live video stream;
obtaining, from the mobile terminal, user behavior data that is generated by a user of the mobile terminal from interacting with the advertisement bitstream, the user behavior data including triggering operation records or a number of times of triggering operation generated from watching the advertisement bitstream; and
in response to a subsequent request from the mobile terminal for another advertisement, identifying a second advertisement based on the user behavior data to be displayed at the mobile terminal.

12. The non-transitory computer readable storage medium according to claim 11, wherein the operation of generating the advertisement insertion mark comprises:
adding an advertisement insertion field into an extended field of an Http Live Streaming (HLS) protocol; and
using the advertisement insertion field as the advertisement insertion mark.

13. The non-transitory computer readable storage medium according to claim 11, wherein the plurality of operations further comprises:
generating the user interface of playing the advertisement bitstream; and
sending the user interface to the mobile terminal for display.

14. The non-transitory computer readable storage medium according to claim 11, wherein the plurality of operations further comprises:
obtaining, from the mobile terminal, data associated with the user; and
storing the data.

15. The non-transitory computer readable storage medium according to claim 14, wherein the data associated with the user includes one or more of a user identity, a device identity for the user identity to log in, and a website address.

* * * * *